United States Patent
Ogikubo

(10) Patent No.: US 7,557,838 B2
(45) Date of Patent: Jul. 7, 2009

(54) IMAGING METHOD AND IMAGING APPARATUS

(75) Inventor: Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 780 days.

(21) Appl. No.: 10/712,965

(22) Filed: Nov. 13, 2003

(65) Prior Publication Data

US 2004/0151479 A1  Aug. 5, 2004

(30) Foreign Application Priority Data

Nov. 15, 2002  (JP)  ............................. 2002-332654

(51) Int. Cl.
    *H04N 5/76*  (2006.01)
(52) U.S. Cl. .................. 348/231.3; 348/231.6
(58) Field of Classification Search .............. 348/231.2, 348/231.3, 231.5, 231.6
    See application file for complete search history.

(56) References Cited

U.S. PATENT DOCUMENTS

| | | | |
|---|---|---|---|
| 5,359,464 A | * | 10/1994 | Wilkinson ................... 386/104 |
| 7,047,305 B1 | * | 5/2006 | Brooks et al. ............... 709/231 |
| 7,120,352 B1 | | 10/2006 | Shimizu |
| 2002/0012522 A1 | * | 1/2002 | Kawakami et al. ............ 386/52 |
| 2003/0011689 A1 | * | 1/2003 | Shioji ....................... 348/231.6 |
| 2003/0146981 A1 | * | 8/2003 | Bean et al. ................ 348/222.1 |
| 2004/0081437 A1 | * | 4/2004 | Asada et al. ................. 386/131 |

FOREIGN PATENT DOCUMENTS

| | | |
|---|---|---|
| EP | 1 168 833 | 1/2002 |
| JP | 10 11951 | 1/1998 |
| JP | 11-177930 | 2/1999 |
| WO | WO 02 39737 | 5/2002 |
| WO | WO0239737 A1 * | 5/2002 |

* cited by examiner

*Primary Examiner*—David L Ometz
*Assistant Examiner*—Dillon Durnford-Geszvain
(74) *Attorney, Agent, or Firm*—Frommer Lawrence & Haug LLP; William S. Frommer

(57) ABSTRACT

An imaging unit reads a signal out of an image pickup device to generate an image signal based on captured image. Signal processor generates image data from the image signal. Sampling analog audio signal allows audio data to be generated. Controller controls operations of the imaging unit and signal processor to alter a frame rate of the image data to a predetermined set frame rate and to generate associated information for indicating the set frame rate or the like. Transmitter combines the associated information with the image data and the audio data to transmit the combined ones as material data.

12 Claims, 12 Drawing Sheets

F I G. 1
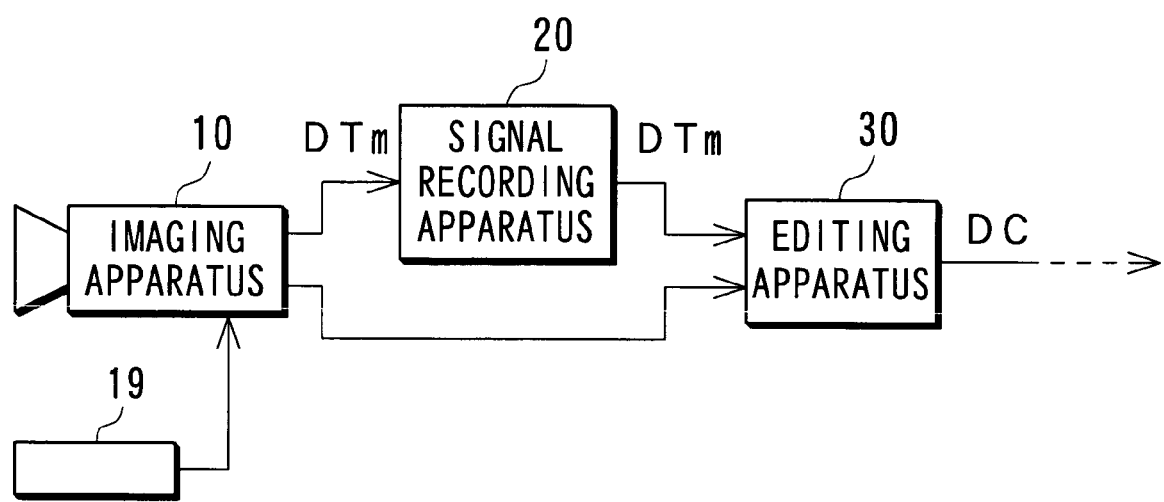

FIG. 12A (DV)

FIG. 12B (DM-FRs)

FIG. 12G (Svm)

FIG. 12J (Svm)

IMAGING METHOD AND IMAGING APPARATUS

BACKGROUND OF THE INVENTION

1. Field of the Invention

The invention relates to an imaging method and an imaging apparatus.

2. Related Art

In generation of contents on audio and/or video for broadcasting, it has been often done to generate the contents altering motion speed of a subject partially for only a set period, in order to obtain enhanced effects the creator wishes to create.

In such the generation of contents altering the motion speed of the subject, a higher frame rate relevant to a reference frame rate is illustratively set to generate the contents, and then the contents are reproduced at the reference frame rate so that slow motion contents can be produced. Alternatively, a lower frame rate relevant to a reference frame rate is set to generate the contents, and then the contents are reproduced at the reference frame rate so that quick motion contents can be produced. Further, adapting the frame rate to be set and the frame rate at the reproduction allows the motion speed of the subject to be freely altered.

Thus, the creator creates the contents for broadcasting using not only the contents generated at the reference frame rate but also the contents of altered motion speed of the subject, in order to obtain the enhanced effects the creator wishes to create when the contents are reproduced at the reference frame rate.

It has been proposed in Japanese Patent Publication No. H11-177930 that the video camera allows time axis to be compressed or extended in order to generate the contents of altered motion speed of the subject by altering the frame rate as described above.

When the contents for broadcasting are generated using not only the contents generated at the reference frame rate but also the contents of altered motion speed of the subject as material, it is not easily determined at editing which of frame rates each of the contents has been generated if merely the material image is displayed. Further, when it performs the speed change on the contents of altered motion speed of the subject, it is impossible to determine whether or not the speed change can be performed without any deterioration in image quality of the displayed image. If a frame rate is set (hereinafter, referred to as, "set frame rate") to 10 times the reference frame rate, the reproduced contents are displayed one-tenth in a motion of subject if the contents generated at the set frame rate are reproduced at the reference frame rate. Here, it is conceivable that since the set frame rate is 10 times the reference frame rate when the creator wants to display the contents one-fifth in a motion of subject, the speed change can be easily performed without any deterioration in image quality of the displayed image if performing a frame-skipping for each frame. It, however, is impossible to determine whether or not the speed change can be performed without any deterioration in image quality of the displayed image, easily based on merely the displayed image.

It is an object of the present invention to present an imaging method and an imaging apparatus wherein determining which of frame rates the imaging has been performed is easily allowed.

SUMMARY OF THE INVENTION

According to an aspect of the present invention, an imaging apparatus comprises imaging device for reading a signal captured out of an image pickup device so as to generate an image signal based on captured image, and signal processor for generating image data based on the image signal. The apparatus also comprises controller for controlling operation of at least one of the imaging device and the signal processor to set a variable frame rate of the image data to a set frame rate, and generating associated information for indicating at least the set frame rate. The apparatus further comprises transmitter for combining the associated information with the image data to transmit the combined ones.

According to another aspect of the present invention, an imaging method comprises the steps of generating image data based on a signal read out of an image pickup device, setting a variable frame rate of the image data to a set frame rate, generating associated information including frame rate information for indicating the set frame rate, and combining the associated information with the image data to transmit the combined ones.

In the present invention, when reading signal captured out of an image pickup device so as to generate image signal based on captured image, and generating image data based on the image signal, the controller controls operation of at least one of the imaging device and the signal processor to set a variable frame rate of the image data to a set frame rate and generates associated information for indicating at least the set frame rate. Thus, the transmitter combines the associated information with the image data to transmit the combined ones. Based on the associated information, determining which of frame rates the imaging has been performed is easily allowed, and thus, the contents of altered motion speed of the subject can be reproduced.

Further, a variable frame rate of the image data is freely set to a set frame rate by means of altering a frequency of reading the signal captured out of the image pickup device, controlling the signal processor to perform frame-skipping, or altering a frequency of reading the signal captured out of the image pickup device and controlling the signal processor to add the image data on a frame basis.

Alternatively, according to the invention, a sub-frame number is added to each of the frames of the set frame rate included within one frame period of reference frame rate. The sub-frame number is included in said associated information. This allows the frame-skipping to be easily performed when the reproduction speed is changed by performing the frame-skipping on frame basis.

Further, according to the present invention, the signal processor samples analog audio signal to generate audio data and the controller controls a sampling frequency of the analog audio signal in the signal processor based on the set frame rate. Then, the transmitter combines the associated information with the image data and the audio data to transmit the combined ones. This allows the audio to be reproduced at a variable speed fitting the image.

Additionally, the imaging apparatus further comprises a signal recording apparatus wherein the transmitter transmits a signal combining the associated information with the image data to the signal recording apparatus recording the signal thus combined on recording medium.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a diagram for illustrating a configuration of contents-providing system;

FIGS. 12A through 12J are illustrations showing a reproduction operation of the image.

DETAILED DESCRIPTION OF PREFERRED EMBODIMENTS

Figure 2:
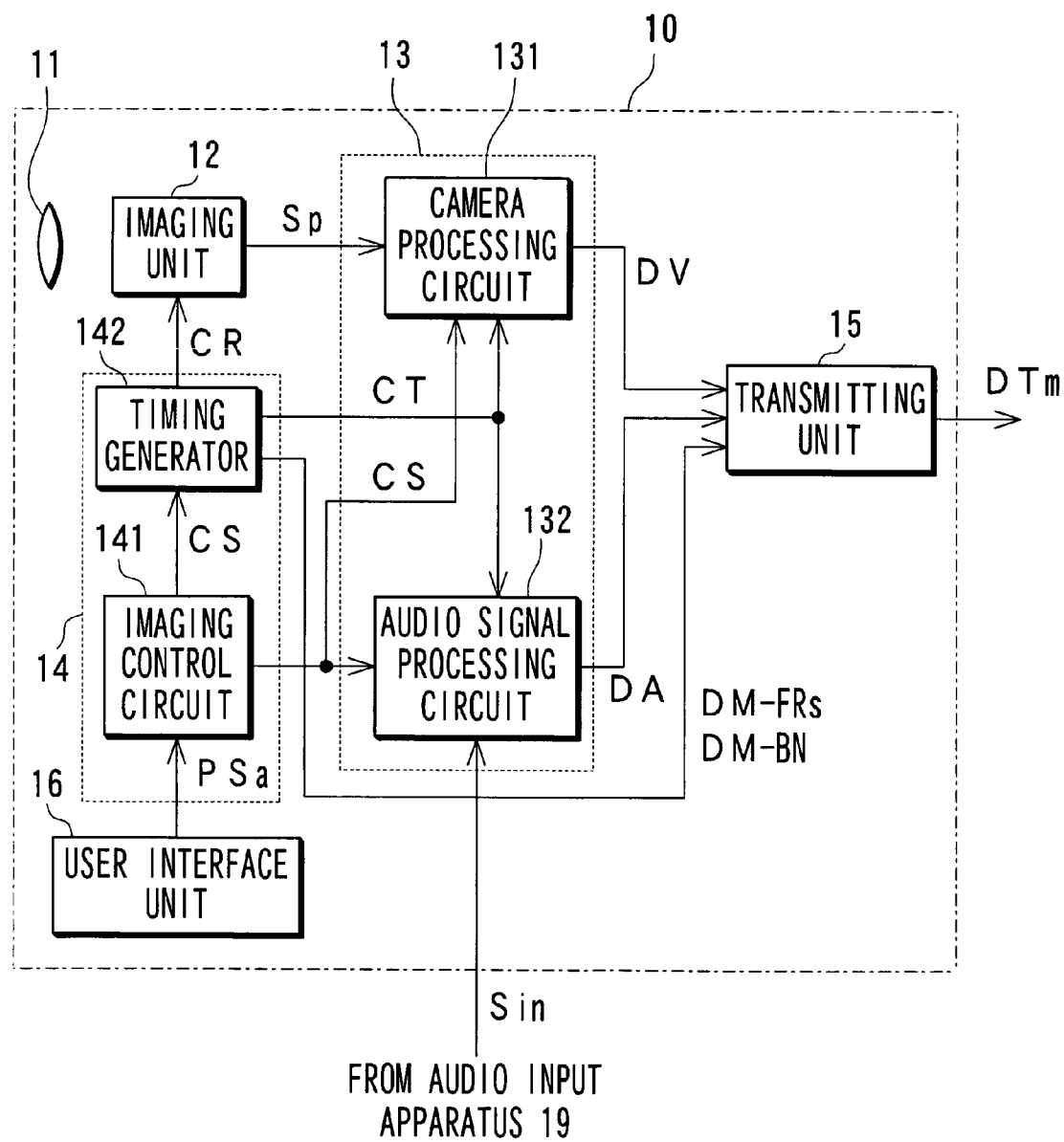
FIG. 2 is a block diagram showing a configuration of imaging apparatus.

Referring to the drawings, the invention will now be described in detail with reference to an embodiment according to the invention. FIG. 1 shows an entire configuration of contents-providing system for providing the contents such as the contents for audio and/or video. An imaging apparatus 10 generates image data having its frame rate variably set and combines associated information including frame rate information on the frame rate of the image data with this image data to supply a signal recording apparatus 20 or an editing apparatus 30 with the combined ones as material data DTm. When the imaging apparatus 10 is provided with an audio input apparatus 19, it generates audio data to supply the signal recording apparatus 20 or the editing apparatus 30 with the audio data and the associated information as material data DTm.

The signal recording apparatus 20 receives the material data DTm and records it on recording medium. It also reproduces the material data DTm recorded on the recording medium and supplies the editing apparatus 30 with the reproduced data. The imaging apparatus 10 and the signal recording apparatus 20 may be composed as a combination camera/recorder system, be combined together each other as so-called "dockable" typed camera/recorder system, and be separately provided with them being connected through a cable.

The editing apparatus 30 receives the material data DTm from the signal recording apparatus 20 or the imaging apparatus 10 and performs editing process on the material data DTm to produce image data and audio data the editor wishes to create. The editing apparatus 30 combines associated information including frame rate information with the image data and the audio data thus produced to generate contents-data DC for broadcasting, distribution, and the like.

FIG. 2 is a block diagram showing a configuration of the imaging apparatus 10. Imaging unit 12 receives incident light through imaging lens system 11 and an image pickup device such as charge coupled device (CCD) mounted within the imaging unit 12 captures subject image on its image surface.

The image pickup device generates imaged charge of the subject image though photoelectric transfer characteristics thereof. The imaging unit 12 also reads out the imaged charge thus generated on the basis of driving signal CR from a timing generator 142, which will be described later, and generates imaged signal Sp having a frame rate that corresponds to the driving signal CR to supply camera processing circuit 131 in signal processor 13 with the imaged signal Sp.

Based on timing signal CT received from the timing generator 142, the camera processing circuit 131 performs various signal processing at timings synchronized with the imaged signal Sp. Illustratively, such the signal processing represents noise-reduction processing for reducing noise components from the imaged signal Sp by means of correlated dual sampling or the like, transformation processing from the imaged signal Sp thus noise-reduced to digital image data, clamp processing of the image data, processing on shading correction and pilling-up of deficiency in the image pickup device, $\gamma$ correction, contour enhancement processing, knee correction, and the like. Further, the camera processing circuit 131 performs other various signal processing under the process conditions based on the operation control signal CS received from imaging control circuit 141 of controller 14. Thus, the camera processing circuit 131 generates image data DV thus obtained according to various signal processing and supplies transmitting unit 15 with the image data DV.

The timing generator 142 of controller 14 generates driving signal CR corresponding to operation control signal CS from the imaging control circuit 141 and supplies the imaging unit 12 with the driving signal CR, thereby allowing a reading-out frequency of imaged charge in the imaging unit 12 to be altered. It, then, also controls a frame rate of the imaged signal Sp to be set to a set frame rate FRs based on an operation signal PSa from user interface unit 16. For example, frame frequency, 59.94 Hz or 29.97 Hz in the case of NTSC system or frame frequency, 50 Hz or 25 Hz in the case of PAL system is set to the frame frequency of reference frame rate FRr and an operation such that the set frame rate FRs is set to the one k times the reference frame rate FRr is carried out (k is positive value, not limited to an integer). If so, a frame rate of the imaged signal Sp is controlled to be equal to the one k times the reference frame rate FRr.

Alternatively, altering a period of reading-out pulse (sensor gate pulse) for transferring imaged charge accumulated on each pixel from the respective pixels in an image pickup device such as CCD to transfer unit or the like allows reading-out frequency of imaged charge to be altered, thereby altering the frame rate.

It may be adapted for Common Data Rate (CDR) system in this case. When the CDR system is used, available frame rate may be altered, and a frame rate of the signal output from the CCD may be constant, thus making processed rate in the camera processing circuit 131 or the like constant.

This CDR system has been generally disclosed in PCT Application No. PCT/JP03/0051 filed on Jan. 22, 2003.

The timing generator 142 also generates timing signal CT synchronized with the driving signal CR and supplies the camera processing circuit 131 and audio signal processing circuit 132 with the timing signal CT. The timing generator 142 further generates frame rate information DM-FRs indicating the set frame rate FRs that is frame rate of image data DV and supplies the transmitting unit 15 with the frame rate information DM-FRs. The timing generator 142 also generates sub-frame number BN. This sub-frame number BN is identification number for identifying each frame included in each of the frame periods of the reference frame rate FRr when the set frame rate FRs is set to be higher than the reference frame rate FRr. The timing generator 142 supplies the transmitting unit 15 with this sub-frame number BN as frame identification information DM-BN.

Figure 3:
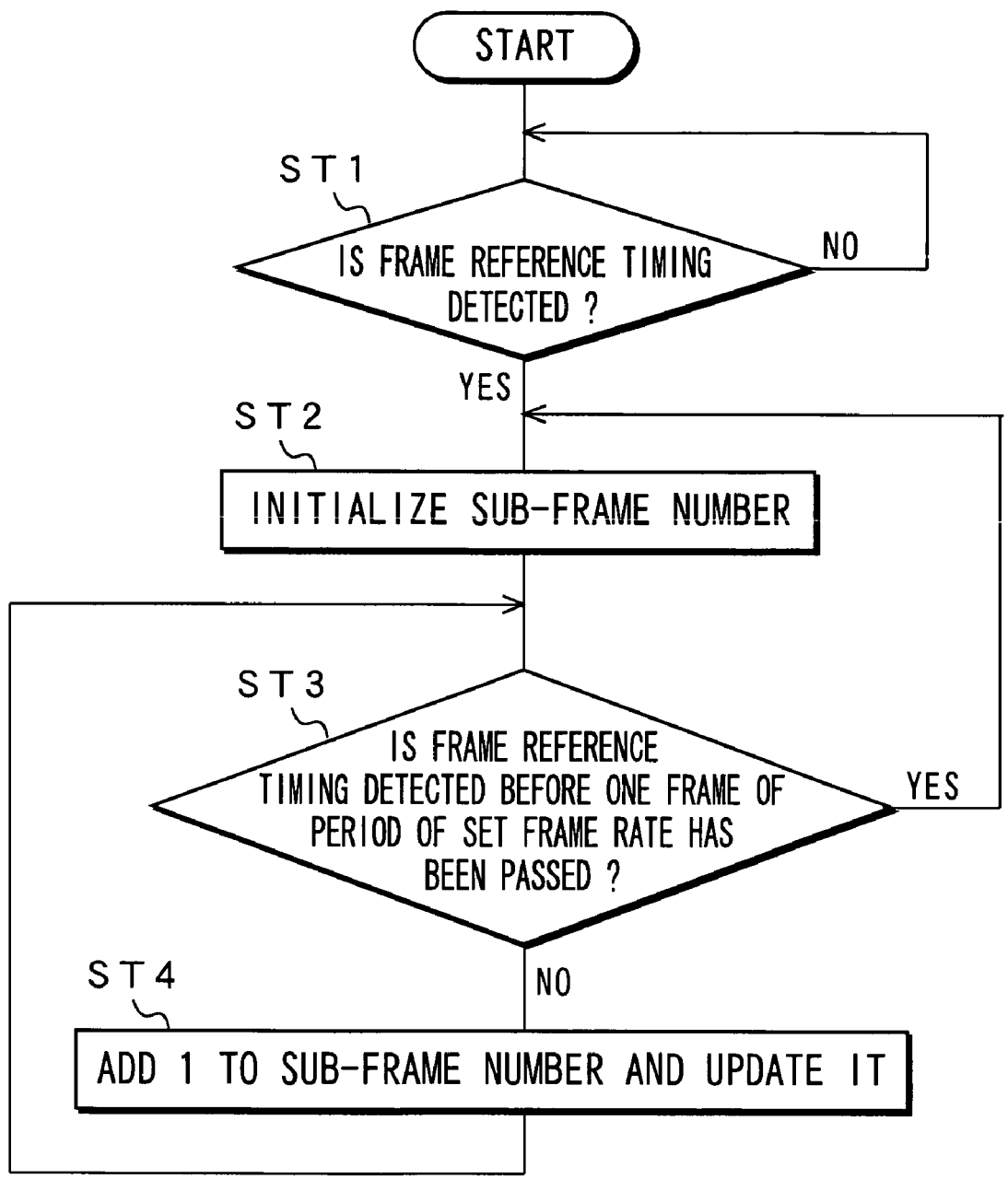
FIG. 3 is a flowchart showing an offer operation of sub-frame number.

FIG. 3 is a flowchart showing an offer operation of sub-frame number in the timing generator 142. The timing generator 142 performs a frequency division on oscillated signal of a predetermined frequency, for example, to set the set frame rate FRs so that the frame periods of the reference frame rate FRr and the set frame rate FRs may be synchronized with each other, thereby generating a frame reference timing indicating a generation of the driving signal CR and a breakpoint between the periods of frames of reference frame rate FRr based on the frame period of the set frame rate FRs.

At step ST1, the timing generator 142 determines whether or not the frame reference timing is detected. If the frame reference timing is detected, the process goes to step ST2. If no frame reference timing is detected, the process goes back to the step ST1.

When the frame reference timing is detected at the step ST1, the process goes to the step ST2, as described above, where the timing generator 142 initializes the sub-frame number BN, thus setting the sub-frame number BN to an initial value, for example, 0. The process then goes to step ST3.

At the step ST3, the timing generator 142 determines whether or not the frame reference timing has been detected during a period of time starting from detecting the frame reference timing and ending before one frame of period of the set frame rate FRs has been passed. If no frame reference timing is detected, the process goes to step ST4 where the timing generator 142 adds 1 to the sub-frame number BN and then updates the added sub-frame number BN. The process then goes back to step ST3. Thus, when no frame reference timing has been detected before one frame of period of the set frame rate FRs has been passed, the sub-frame number BN is allocated in sequence to the set frame rate FRs for each of the frames of periods thereof.

Thereafter, when the timing generator 142 detects the frame reference timing before one frame of period of the set frame rate FRs has been passed, the process goes back to the step ST2 where the sub-frame number BN is initialized.

Every frame of period of the reference frame rate FRr, the sub-frame number BN may be added to the frame image of the set frame rate FRs provided during a frame period of time.

Referring back to FIG. 2, the imaging control circuit 141 of the controller 14 is connected with the user interface unit 16. When, in the imaging apparatus 10, switching operation and alteration operation of the frame rate are performed, the user interface unit 16 generates operation signal PSa corresponding to these operations and supplies the imaging control circuit 141 with the operation control signal PS. When receiving the operation signal PSa from external equipment such as a remote controller, not shown, the user interface unit 16 also supplies the imaging control circuit 141 with the operation signal PSa.

The imaging control circuit 141 generates operation control signal CS to allow the imaging apparatus 10 to be operated according to the operation signal PSa based on the operation signal PSa received from the user interface unit 16. It also supplies the camera processing circuit 131 and the timing generator 142 with the operation control signal CS.

The audio signal processing circuit 132 receives analog audio signal Sin. The audio signal processing circuit 132 also performs sampling process on the analog audio signal Sin based on timing signal CT received from the timing generator 142 to generate digital audio data DA and supply the transmitting unit 15 with the digital audio data DA.

The transmitting unit 15 generates associated information DM including the frame rate information DM-FRs and the frame identification information DM-BN and combines the image data DV and the audio data DA with the associated information DM to generate material data DTm. The transmitting unit 15 supplies the signal recording apparatus 20 or the editing apparatus 30 with the material data DTm. The associated data DM may include not only information on the set frame rate FRs and the sub-frame number BN but also information on imaged date and time, imaged condition, imaged contents, and the like.

It is conceivable that as a way to combine the image data DV and the audio data DA with the associated information, the associated information DM is inserted into a data stream of image or a header of the data stream when the image data DV and the audio data DA are compressed to generate the material data DTm as the data stream.

For example, when a moving picture compression system in Moving Picture Experts Group (MPEG) standardized as ISO (International Organization for Standardization)/IEC (International Electrotechnical Commission) 13818-2 is utilized, the associated information DM may be inserted into a region for extension or the like provided in a picture layer, thereby allowing the associated information DM to be inserted on a picture basis. Alternatively, when a synchronization multiplexed system in MPEG standardized as ISO/IEC 13818-2 is utilized, the associated information DM may be inserted into an optional field or the like provided in a header in Packetized Elementary Stream (PES).

Further, it is conceivable that when SDI format standardized as SMPTE (Society of Motion Picture and Television Engineers) 259M, Television-10-Bit 4:2:2 Component and 4 fsc Composite Digital Signals-Serial Digital Interface, in order to transfer non-compressed image and audio data, SDTI format standardized as SMPTE 305M, Television-Serial Data Transport Interface (SDTI), in order to transfer compressed image and audio data, or SDTI-CP format standardized as SMPTE 326M, Television-SDTI Content Package Format (SDTI-CP) that obtained by further defining SDTI format is utilized, the associated information DM may be inserted into a signal having each format as UMID data standardized as SMPTE 330M, Television-Unique Material Identifier (UMID). In the present invention, a way to combine the image data DV and the audio data DA with the associated information is not limited to the above ones. Various ways to do so are conceivable.

UMID is an identifier for uniquely identifying material data such as image data and audio data. UMID defines Basic UMID or Extended UMID that is identifier as being obtained by adding Signature Metadata to Basic UMID. Basic UMID includes a label for identifying digital data, information for indicating whether or not overwrite or editing is performed on the material data, a number for distinguishing the material data from each other, and the like. Signature Metadata includes information on material-data-forming date and time, correction information (information on difference in time) concerning material-data-forming time, location information indicative of latitudes, longitudinal, and altitude, information on name of organization, and the like. Signature Metadata also includes a region for user code, to which the associated information DM may be stored, for example.

Figure 4:
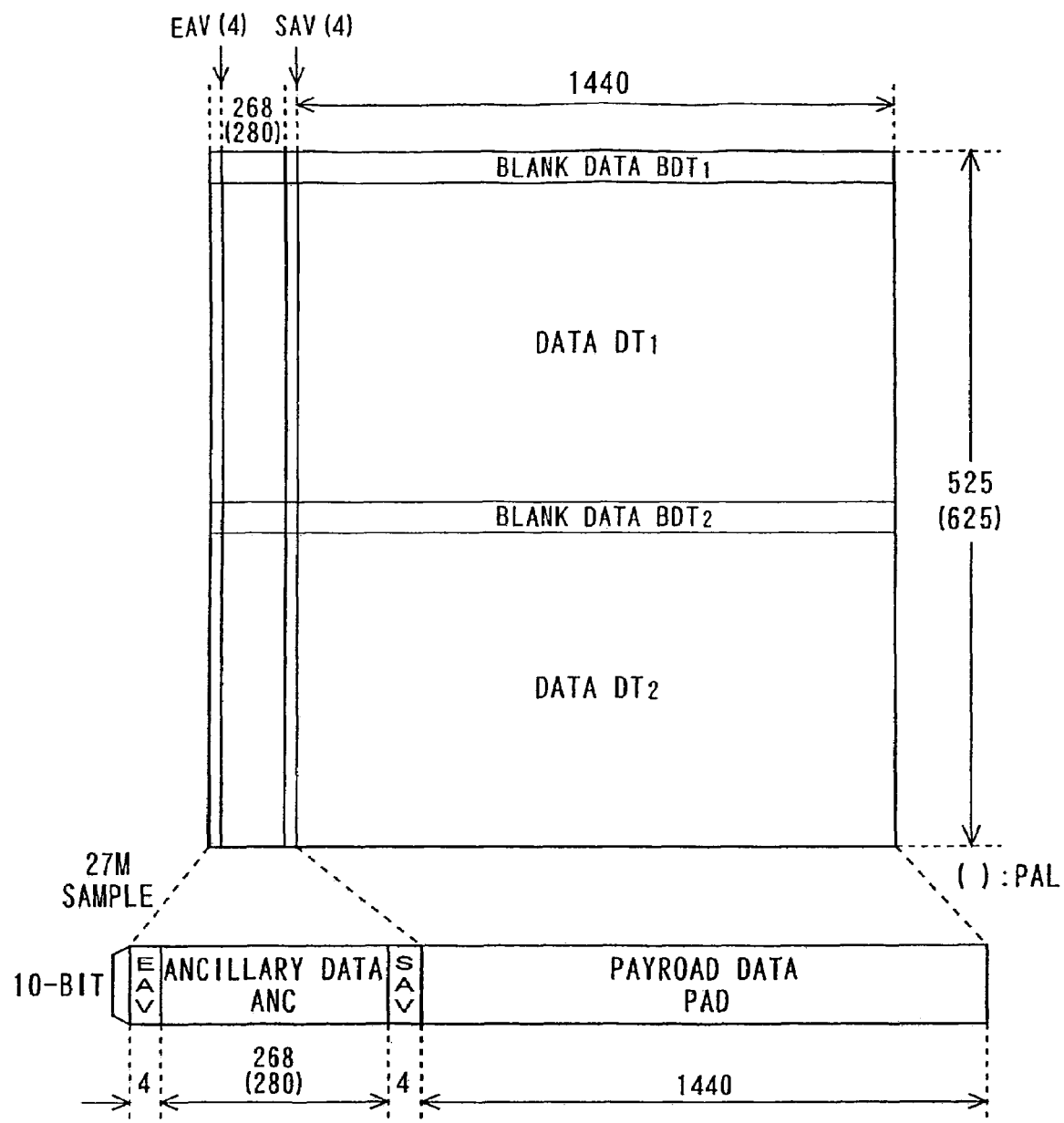
FIG. 4 is an illustration illustrating SDI format.
Figure 5:
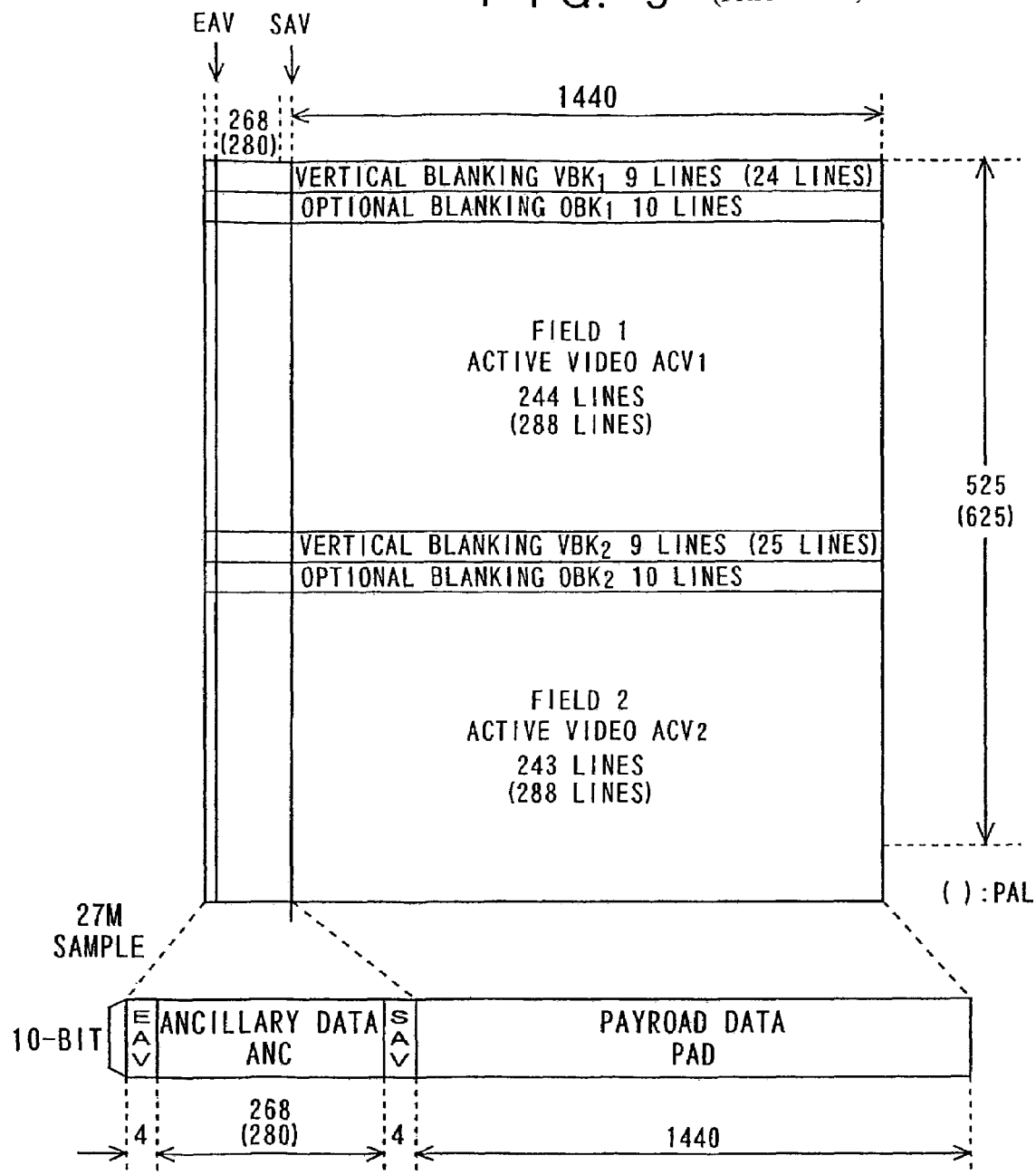
FIG. 5 is an illustration illustrating SDTI format.
Figure 6:
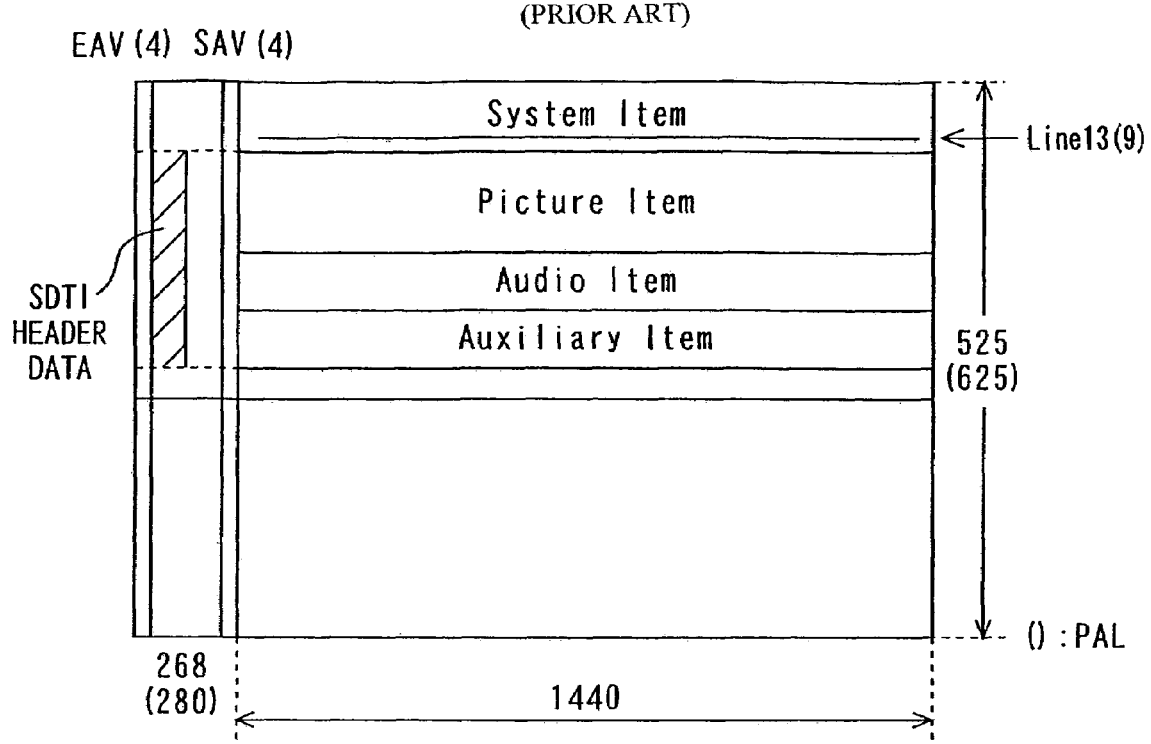
FIG. 6 is an illustration illustrating SDTI-CP format.

The Extended UMID thus obtained is inserted into each of the signals having various formats. When SDI format is utilized, the Extended UMID is inserted into an ancillary data region, as shown in FIG. 4. When SDTI format is utilized, the Extended UMID is inserted into an ancillary data region except for a header data portion, as shown in FIG. 5. When SDTI-CP format is utilized, the data to be inserted is inserted into a payload region on an item basis. Specifically, as shown in FIG. 6, system item composed of information on image and audio, picture item composed of image data, audio item composed of audio data, and auxiliary (AUX) item composed of other data are inserted in sequence. In the system item, regions for metadata sets such as Package Metadata set, Picture Metadata set, audio Metadata set, and Auxiliary Metadata set are provided to allow the metadata to be inserted thereinto. This permits the extended UMID to be inserted into these regions.

The above imaging apparatus 10 alters read-out frequency of imaged charge in the imaging unit 12 to generate the material data DTm of a predetermined set frame rate FRs, thereby allowing the set frame rate FRs to be successively altered. If, however, the set frame rate FRs is altered solely in a stepwise, frame-skipping allows the material data DTm of a predetermined set frame rate FRs to be generated. This is, generating image data DVa having a constant frame rate higher than the set frame rate FRs and extracting image data of only the set frame rate FRs from the image data DVa allows the material data DTm of a predetermined set frame rate FRs to be generated.

Figure 7:
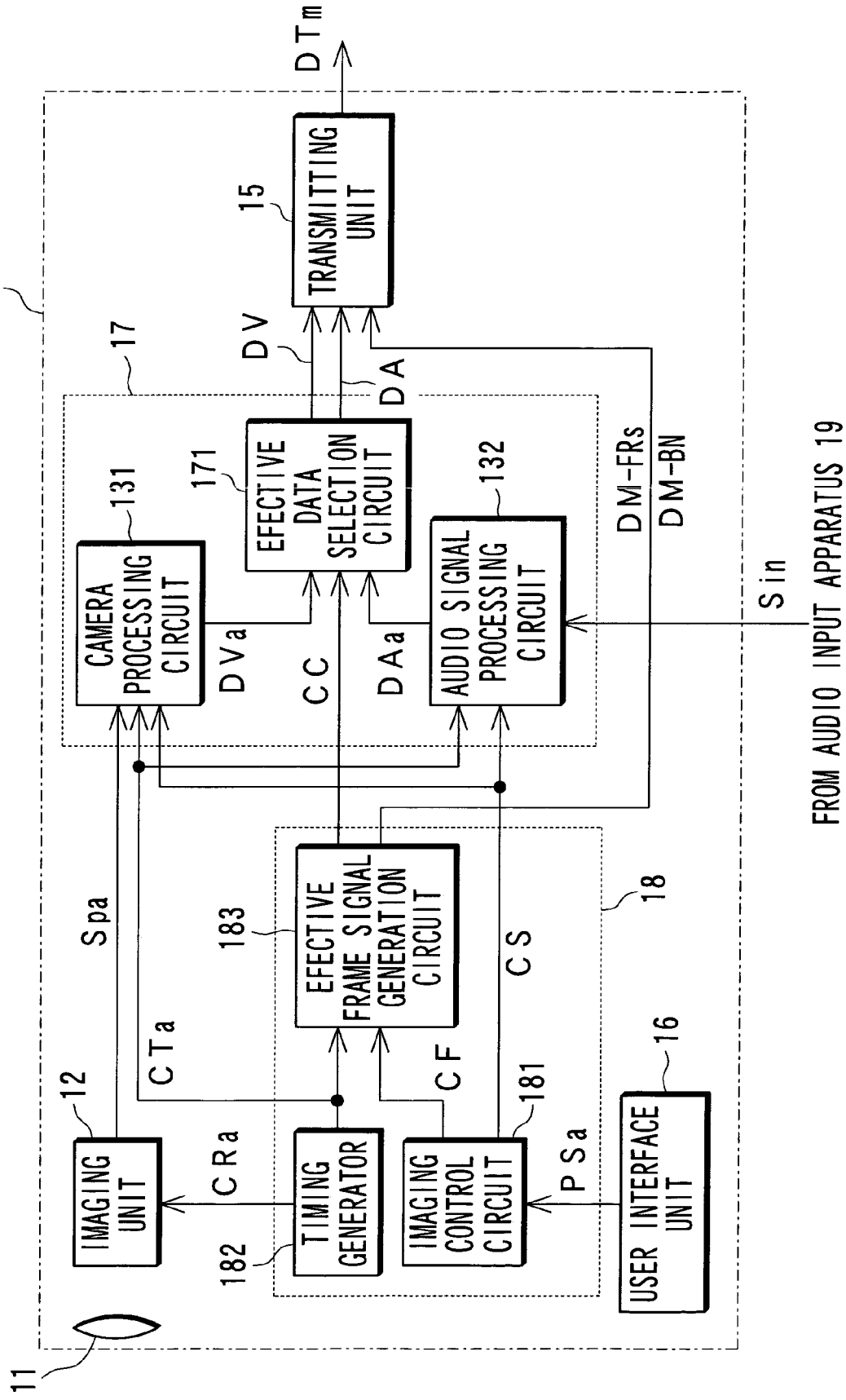
FIG. 7 is a block diagram showing a configuration of another imaging apparatus.

FIG. 7 shows a configuration of another imaging apparatus 10a performing such a generation. In FIG. 7, like reference numbers refer to like elements shown in FIG. 2 and thus, the detailed description thereof is omitted.

Timing generator 182 in controller 18 generates driving signal CRa corresponding to the highest value of the set frame rate FRs that is set through user interface unit 16 and supplies the imaging unit 12 with the driving signal CRa. Based on the driving signal CRa, the imaging unit 12 generates imaged signal Spa having a fixed frame rate FRq higher than a reference frame rate. The imaging unit 12 then supplies camera processing circuit 131 with the imaged signal Spa. When the set frame rate FRs may be altered up to n times (where n is positive number) the reference frame rate FRr, the imaging unit 12 generates the imaged signal Spa having a frame rate n times the reference frame rate FRr, and supplies the camera processing circuit 131 with the imaged signal Spa. In other words, the imaging unit 12 generates the imaged signal Spa having a fixed frame rate without any influence of the set frame rate FRs that is set through the user interface unit 16.

The timing generator 182 also generates timing signal CTa synchronized with the driving signal CRa and supplies the camera processing circuit 131 and audio signal processing circuit 132 in signal processor 17 and effective frame signal generation circuit 183 in the controller 18 with the timing signal CTa.

The camera processing circuit 131 generates image data DVa of fixed frame rate FRq based on the imaged signal Spa and supplies the effective data selection circuit 171 with the image data DVa. The audio signal processing circuit 132 carries out a sampling based on the timing signal CTa of a fixed frequency to generate audio data DAa and supplies the effective data selection circuit 171 with the audio data DAa.

Imaging control circuit 181 generates a set information signal CF indicating a set frame rate FRs based on operational signal PSa received from the user interface unit 16 and supplies the effective frame signal generation circuit 183 with the set information signal CF.

The effective frame signal generation circuit 183 extracts data on a frame basis from the image data DVa based on a ratio of the fixed value of frame rate FRq of the image data DVa to a value of the set frame rate FRs indicated in the set information signal CF and generates extraction control signal CC for generating image data DV of the set frame rate FRs. The effective frame signal generation circuit 183 also synchronizes the extraction signal CC with the timing signal CTa and supplies the effective data selection circuit 171 with the synchronized extraction control signal CC. When the frame rate FRq of the image data DVa is n times the reference frame rate FRr and the set frame rate FRs is n/2 times the reference frame rate FRr, the effective frame signal generation circuit 183 generates the extraction control signal CC for controlling data extraction on a frame basis every other frame from the image data DVa and supplies the effective data selection circuit 171 with the extraction control signal CC synchronized with the timing signal CTa.

The effective frame signal generation circuit 183 further generates frame rate information DM-FRs indicating the set frame rate FRs based on the set information signal CF and supplies the transmitting unit 15 with the frame rate information DM-FRS. Since the effective frame signal generation circuit 183 may determine a number of frame during a period of frame with the reference frame rate FRr according to the extraction control signal CC, the effective frame signal generation circuit 183 sets sub-frame number on a frame during a period of each frame with the reference frame rate FRr. The effective frame signal generation circuit 183 then supplies the transmitting unit 15 with this sub-frame number BN as the frame identification information DM-BN.

The effective data selection circuit 171 extracts the image data DVa and the audio data DAa of the frame indicated by the extraction control signal CC and supplies the transmitting unit 15 with them as the image data DV and the audio data DA. It is conceivable that the effective frame signal generation circuit 183 may supply the effective data selection circuit 171 with the frame rate information DM-FRs indicating the set frame rate FRs, and the effective data selection circuit 171 may perform frame-skipping on the audio data DAa according to a ratio of the set frame rate FRs to a frame rate when the audio data DAa is generated. When the frame rate FRq in generating the audio data DAa is n times the reference frame rate FRr and the set frame rate FRs is n/2 times the reference frame rate FRr, the effective data selection circuit 171 performs the frame-skipping on the audio data DAa every other sample. In this case, since an interval of the frame-skipping may be shortened as compared by a case where performing the frame-skipping on the audio data DAa on a frame basis, audio having an excellent sound quality may be get based on the audio data DA.

Thus, the image data DVa having a fixed frame frequency makes unnecessary the alteration of operation frequencies in the imaging unit 12 and the camera processing circuit 131 of the signal processor 17. This allows configurations of the imaging unit 12 and the camera processing circuit 131 to be made simpler. Since only the data extraction on a frame basis from the image data DVa may generate image data DV of the set frame rate FRs, generating the image data DV of a predetermined set frame rate FRs from the image data Dva is easily allowed.

When the imaging apparatus is provided with video memory or an adder and a divider, it may generate the image data DV by adding the image data every the predetermined frames. This allows a variable range of frame rate in the imaged signal Sp to be limited and the frame rate FRs to be successively altered. Adding the imaged signal Sp of n frames and dividing the signal level by n allows the signal having a frame rate 1/n times the imaged signal Sp to be obtained even if a frame rate of the imaged signal Sp is not divided by n.

Further, successively altering the read-out frequency of imaged charge allows the set frame rate FRs to be successively altered.

FIGS. 8A through 8E and 9A through 9E are diagrams showing relationship between the image data DV generated by the imaging apparatus 10, 10a and the associated information DM.

Figure 8:
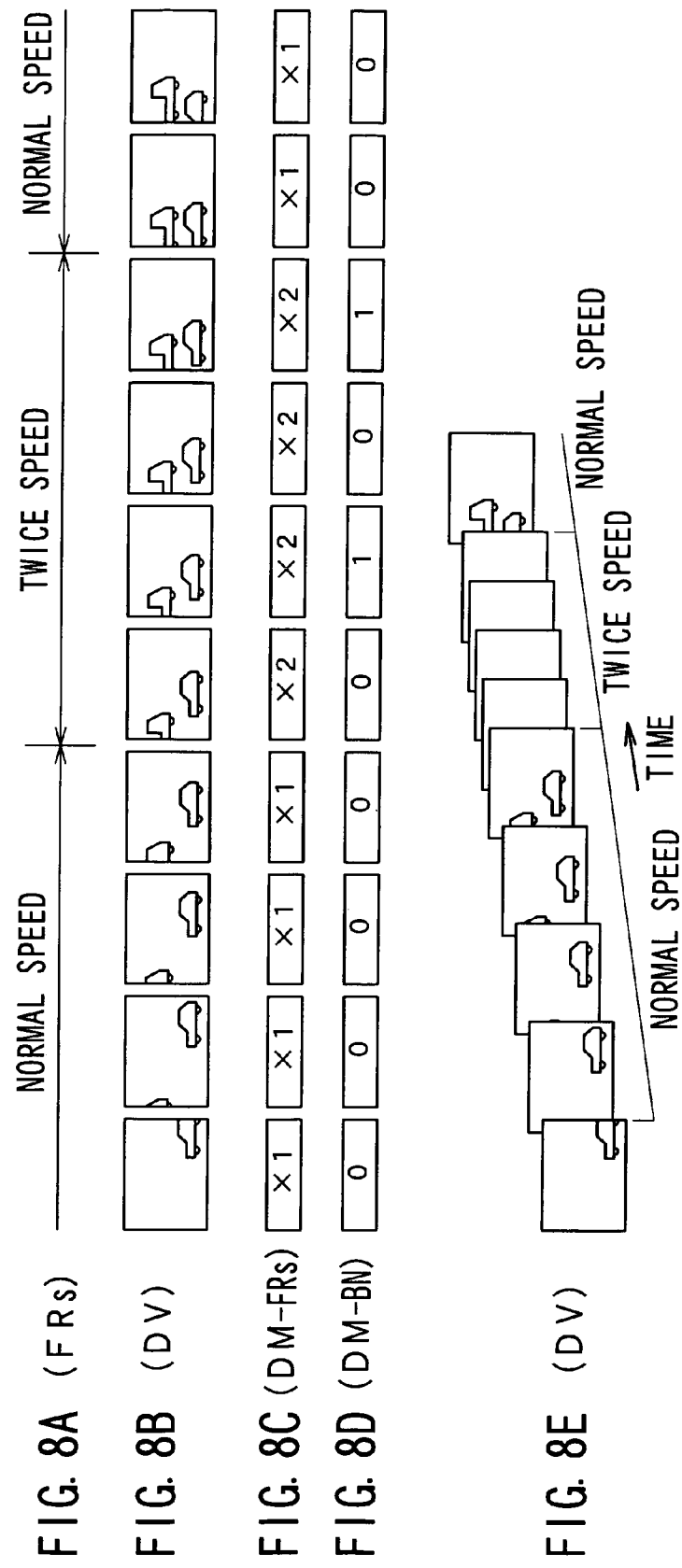
FIGS. 8A through 8E are diagrams showing relationship (part 1) between the image data and the associated information.

When the set frame rate FRs is set to the one equal to or twice the reference frame rate FRr as shown in FIG. 8A, the associated information DM that includes the frame rate information DM-FRs indicating the set frame rate FRs, as shown in FIG. 8C, and the frame identification information DM-BN indicating the sub-frame number BN, as shown in FIG. 8D is combined with image data DV as shown in FIG. 8B (in FIG. 8B, frame images based on the image data DV are shown). FIG. 8E illustrates a relationship between time and the frame images. The frame rate information DM-FRs may include a magnification of the set frame rate FRs to the reference frame rate FRr in addition to the set frame rate FRs. The frame rate information DM-FRs is indicated by the magnification in FIGS. 8E, 9C, and 12B.

Figure 9:
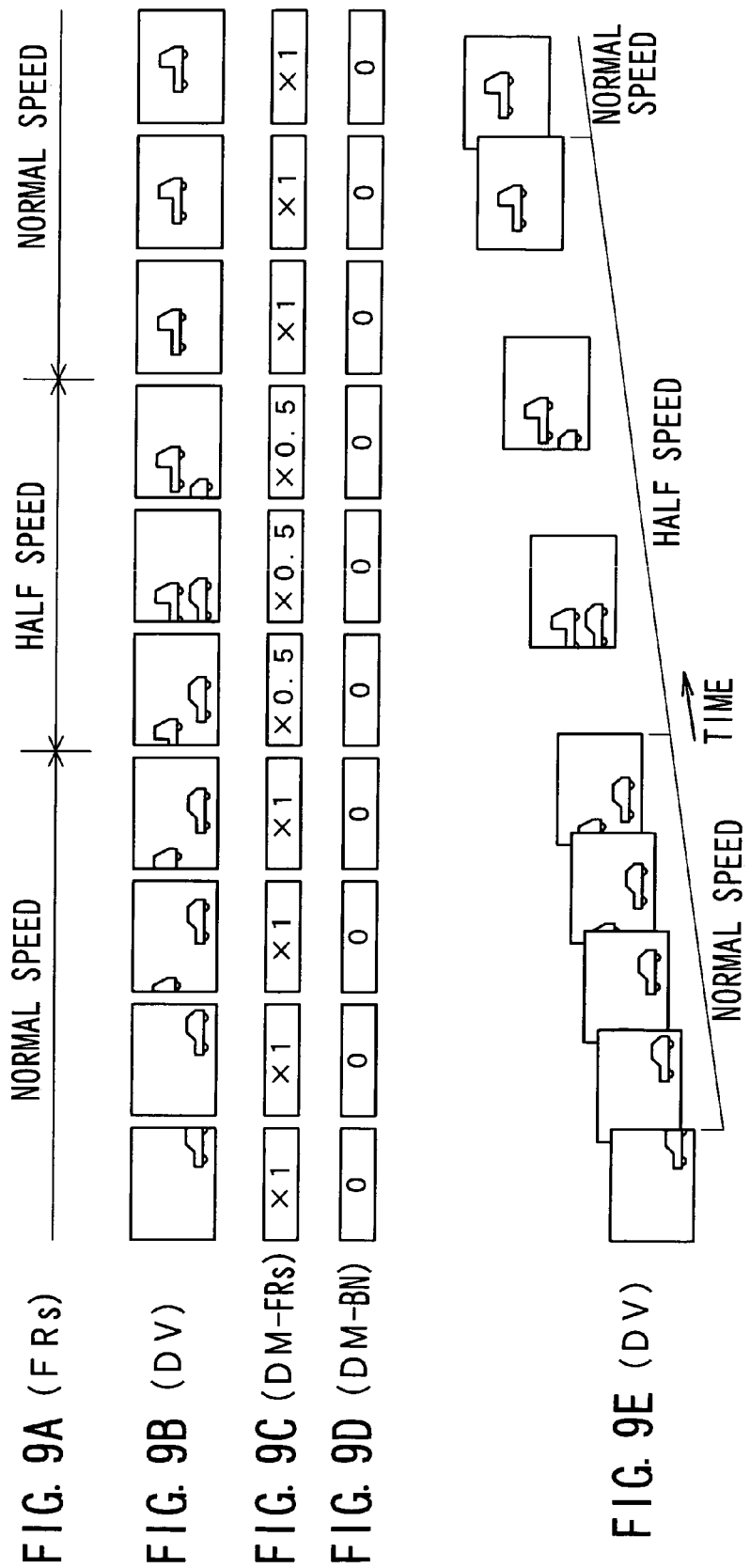
FIGS. 9A through 9E are diagrams showing relationship (part 2) between the image data and the associated information.

When the set frame rate FRs is set to the one equal to or half as much as the reference frame rate FRr as shown in FIG. 9A, the associated information DM that includes the frame rate information DM-FRs indicating the set frame rate FRs, as shown in FIG. 9C, and the frame identification information DM-BN indicating the sub-frame number BN, as shown in FIG. 9D is combined with image data DV as shown in FIG. 9B (in FIG. 9B, frame images based on the image data DV are shown). FIG. 9E illustrates a relationship between time and the frame images.

Figure 10:
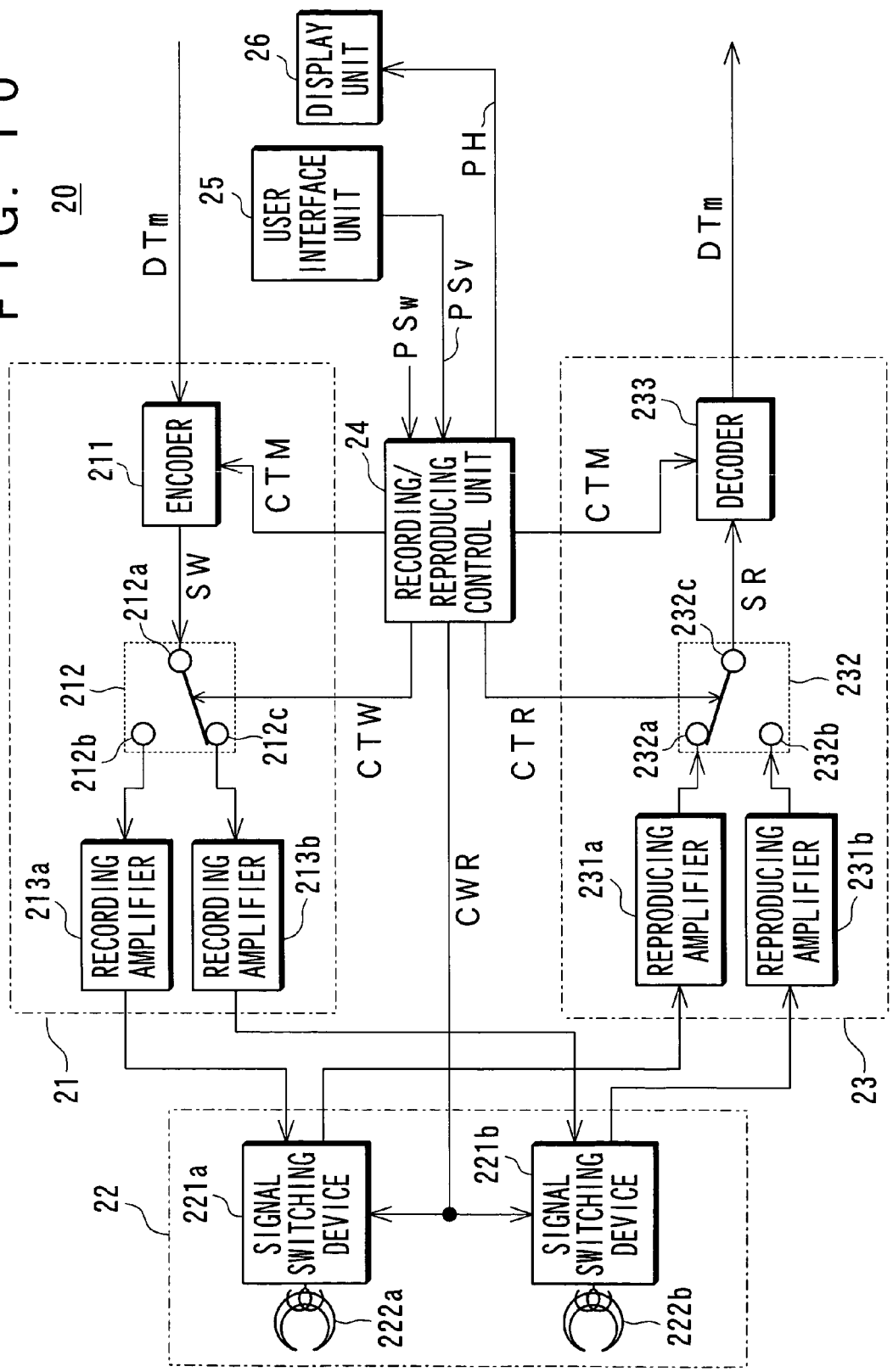
FIG. 10 is a block diagram showing a configuration of signal-recording apparatus.

FIG. 10 shows a configuration of signal-recording apparatus 20 such as a videotape recorder.

When the material data DTm that combines main data indicating image and/or audio with the associated information including frame rate information of the main data is input, encoder 211 of signal-recording processor 21 receives the material data DTm as recording data. The encoder 211 produces error-correcting codes and performs data-shuffling, multiplexing, channel coding, and the like based on operation control signal CIM received from a recording/reproducing control unit 24 using the material data DTm thus received so that the encoder 211 can generate recording signal SW. The encoder 211 then supplies a terminal 212a of a changeover switch 212 with the generated recording signal SW.

The recording/reproducing control unit 24 supplies the changeover switch 212 with a switch control signal CTW. Operations of the changeover switch 212 are controlled based on the switch control signal CTW and thus, the recording signal SW is supplied to recording amplifier 213a or 213b through terminal 212b or 212c of the changeover switch 212.

The recording amplifier 213a receives and amplifies the recording signal SW and supplies signal-switching device 221a of signal recording/reproducing unit 22 with the amplified signal SW. The recording amplifier 213b receives and amplifies the recording signal SW and supplies signal-switching device 221b of the signal recording/reproducing unit 22 with the amplified signal SW.

When recording a signal, the signal-switching device 221a supplies magnetic head 222a with the amplified recording signal SW received from the recording amplifier 213a based on a changeover control signal CWR received from the recording/reproducing control unit 24. When reproducing a signal, the signal obtained by the magnetic head 222a is supplied to reproducing amplifier 231a of the signal reproduction processor 23. Similarly, when recording a signal, the signal-switching device 221b supplies magnetic head 222b with the amplified recording signal SW received from the recording amplifiers 213b based on a changeover control signal CWR received from the recording/reproducing control unit 24. When reproducing a signal, the signal obtained by the magnetic head 222b is supplied to reproducing amplifier 231b of the signal reproduction processor 23.

Thus, supplying the magnetic heads 222a, 222b built in a rotating head drum (not shown) with the amplified recording signal SW allows image data and audio data, and the associated information to be recorded on magnetic tape, which is not shown. The magnetic heads 222a, 222b read out the signal recorded on the magnetic tape and supplies the reproducing amplifiers 231a, 231b, respectively, with the read-out signal.

The reproducing amplifier 231a receives and amplifies a signal obtained by the magnetic head 222a and supplies a terminal 232a of a changeover switch 232 with the amplified signal. The reproducing amplifier 231b receives and amplifies a signal obtained by the magnetic head 222b and supplies a terminal 232b of the changeover switch 232 with the amplified signal. A terminal 232c of the changeover switch 232 is connected with a decoder 233.

The recording/reproducing control unit 24 supplies the changeover switch 232 with a switch control signal CTR. Operations of the changeover switch 232 are controlled based on the switch control signal CTR on which the signals output from the recording amplifiers 213a, 213b, respectively, are selected. The selected signal is supplied to the decoder 233 as reproduced signal SR. The decoder 233 decodes the reproduced signal SR and performs data separation, de-shuffling, an error-correcting processing, and the like based on operation control signal CTM received from the recording/reproducing control unit 24. Thus, the decoder 233 generates the material data DTm that combines main data indicating image and/or audio with the associated information including frame rate information of the main data and then transmits the combined ones.

The recording/reproducing control unit 24 is connected with interface unit 25. The recording/reproducing control unit 24 receives operational signal PSv from the interface unit 25 or another operational signal PSw from an external apparatus such as the editing apparatus 30. The recording/reproducing control unit 24 also generates the switch control signals CTW, CTR and the operation control signals CTM, CTM controlling operations of the encoder 211 and the decoder 233, respectively, based on the operational signal PSv or PSw. The recording/reproducing control unit 24 further performs a driving control of a magnetic tape or a rotation head. The recording/reproducing control unit 24 generates a display signal PH and supplies display unit 26 with it to display an operational condition of a video tape recorder, and various information and the like.

Although a case where the material data DTm is recorded on the magnetic tape has been shown in FIG. 10, the material data may be recorded on disk-like optical or magnetic recording medium or signal-reproduction device using semiconductor storage element.

The signal-recording apparatus 20 is enough if the image data DV and audio data DA are combined with the associated information CM and they are recorded or transmitted. Thus, the material data DTm to be input is not limited to the one having the associated information inserted into the data stream, header, or the like. The material data may be supplied through different signal lines.

Combining the main data with the associated information DM allows editing processing and variable speed reproduction to be easily performed using the data generated by the imaging apparatus 10, 10a or the data recorded on the recording medium by the signal-recording apparatus 20.

During an editing process of the data combining the main data with the associated information DM, a speed available for a reproduction may be set based on the set frame rate FRs. This speed is set so that a natural reproduction image can be realized through a frame-skipping of a predetermined frame period or a frame repetition. If a multiple of the set frame rate FRs to the reference frame rate FRr is more than one, namely, FRs/FRr>1, the speed available for reproduction is set by searching for the divisors of this multiple other than one and calculating the reciprocals of the searched divisors. If the set frame rate FRs is 10 times the reference frame rate FRr, the divisors of this multiple, 10 other than one are of 2, 5, and 10 and thus, the reciprocals thereof are of ½, ⅕, and ⅒, respectively. Selection of one of the reciprocals of divisors allows the speed available for reproduction to be set to less than the same speed as normal reproduction speed. When the speed available for reproduction not less than the same speed as the normal reproduction speed is set to positive integer multiples of the normal reproduction speed, the frame-skipping periods in each of the speeds available for reproduction may be equal to each other.

If a multiple of the set frame rate FRs to the reference frame rate FRr is less than one, namely, FRs/FRr<1, the speed available for reproduction is set by searching for the reciprocals of this multiple and calculating the divisors of the searched reciprocals other than one or integer multiples of the searched reciprocals. If the set frame rate ERs is ⅙ times the reference frame rate FRr, the divisors of the searched reciprocals other than one are of 2, 3, and 6 and the integer multiples of the reciprocals are of 6, 12, 18, - - - , respectively. Selection of one of them allows the speed available for reproduction to be set. This allows frame-skipping periods or numbers of the frame repetitions in each of the speeds available for reproduction may be equal to each other. The speed available for reproduction of less than the same speed as the normal reproduction speed is set to the one/positive multiples the normal reproduction speed. This allows numbers of the frame repetitions in each of the speeds available for reproduction to be equal to each other. Since, however, this is concerned with a repetition of images, a lower limit of the speed available for reproduction may be set to the same speed as the normal reproduction speed.

Figure 11A:
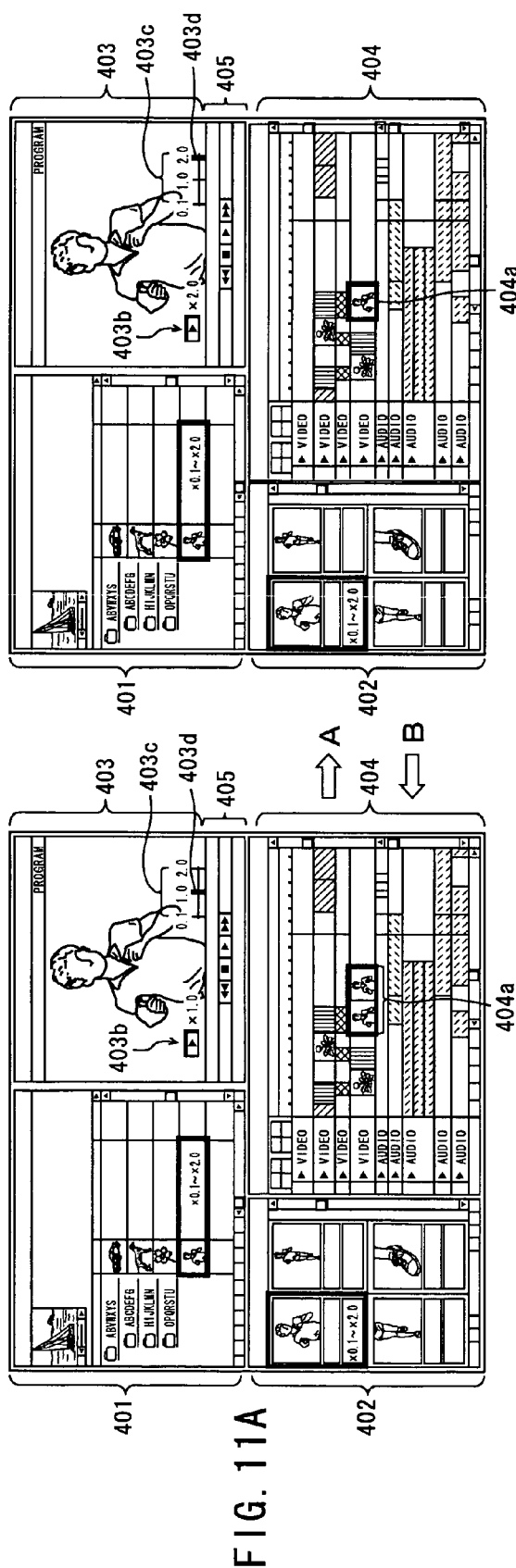
FIGS. 11A through 11C are illustrations each showing GUI representation at an editing operation.
Figure 11B:
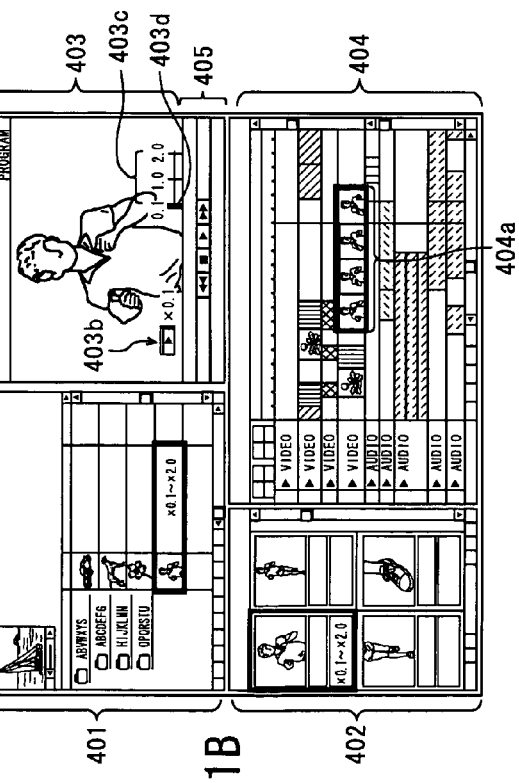
Figure 11C:
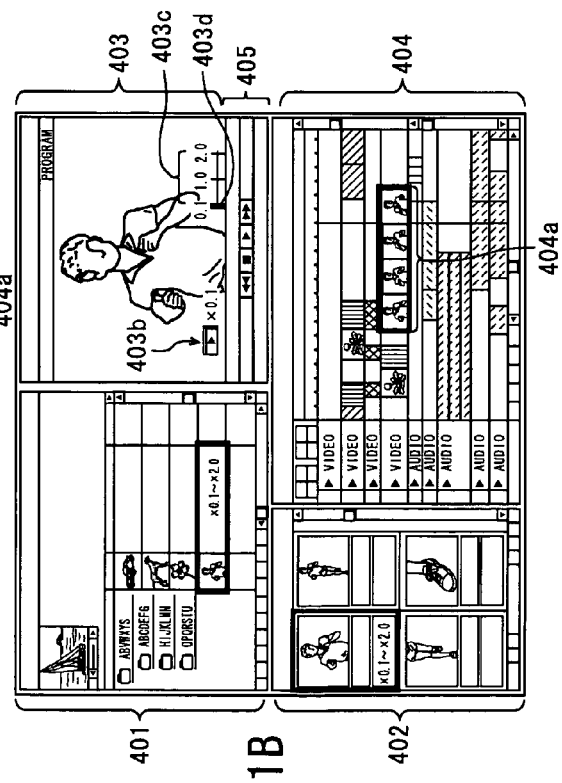

FIGS. 11A through 11C illustrate GUI representations each for an editing operation using the associated information. For example, in each of the GUI representations, a material administration browser window 401 as material administration display is provided at an upper-left side thereof; a story board window 402 as reproduction order display is provided at an lower-left side thereof; a monitor viewer window 403 as reproduced image display for displaying an image before or after the editing process is provided at an upper-right side thereof; and a time line window 404 as reproduction time order display is provided at a lower-left side thereof. An operation control bar 405 is provided between the monitor viewer window 403 and the time line window 404.

FIG. 11A illustrates the GUI representation where the reproduction speed is the same speed as the normal reproduction speed. FIG. 11B illustrates the GUI representation where the reproduction speed is a tenth the normal reproduction speed. FIG. 11C illustrates the GUI representation where the reproduction speed is twice as much as the normal reproduction speed. Locations and sharps of the material administration browser window 401, the story board window 402, the monitor viewer window 403, the time line window 404, and the operation control bar 405 are respectively illustrative ones and thus, of course, they are not limited to the above locations and sharps.

The material administration browser window 401 shows a list of items of the material data available for editing. For each item of the material data, a stamp view (a thumbnail view) for indicating a title, a length, contents of items of the stored material data is shown.

The story board window 402 serves as a working area for a production of contents. Arranging the items of material data on the reproduced order allows the contents to be produced.

The monitor viewer window 403 represents not only an image based on the material data but also a location of reproduction and a variable speed bar for indicating a variable range of reproduction speed.

The time line window 404 serves as a working area for a production of contents according to a more detailed method to allocate items of the material data along a time axis.

The operation control bar 405 represents an operation key for reproducing the items of material data and the contents arranged on the time line window 404.

When reproducing the selected material data, the set frame rate FRs is determined on the basis of the associated information DM, and then, such a calculation that the reproduction speed FP multiplied by the set frame rate FRs equals a determined value FD is performed. Reproduction process conditions are determined on the determined value FD. When the reproduction speed is the same speed as the normal reproduction speed as shown in FIG. 11A and the set frame rate FRs is 10 times the reference frame rate FRr, the reproduction speed FP multiplied by the set frame rate FRs equals the determined value FD as (1*10=10).

FIG. 12A illustrates images based on the image data DV where the set frame rate FRs is 10 times the reference frame rate FRr. FIG. 12B illustrates the frame rate information DM-FRs for indicating the set frame rate FRs of each of the frame images. FIG. 12C illustrates the frame identification information DM-BN for indicating the sub-frame numbers. FIG. 12D illustrates the absolute frame numbers AN of the frame images. Since the set frame rate FRs is 10 times the reference frame rate FRr, there are 10 frame images of the set frame rate FRs within one frame period of the reference frame rate FRr, thereby repeating the sub-frame numbers of zero through nine.

When the determined value FD is set to 10, namely, FD=10, as shown in FIGS. 12E through 12G, the image signal Svm is generated using every 10 frames, namely, with the image data of nine frames being skipped. This allows reproduced image having same speed as the normal reproduction speed to be represented on the monitor viewer 403 based on the image signal Svm. FIG. 12E illustrates the frame identification information DM-BN for indicating the sub-frame numbers. FIG. 12F illustrates the absolute frame numbers AN of the frame images. FIG. 12G illustrates frame images represented by the image signal Svm.

An operation is carried out such that an indicated width of a frame image representation region 404a in the time line window 404 of FIG. 11A is enlarged along a direction indicated by an arrow A or a sliding cursor 404d represented by a short bold line in a console indication 403c for variable speeds in the monitor viewer 403 is slid on a direction indicated by an arrow B. In this case, a processing as the slow motion of reproduction is performed. For example, when the speed available for reproduction is set to ⅒ times the normal reproduction speed, a reproduction speed indication 403b in the monitor viewer 403 is altered to "×0.1" as shown in FIG. 11B. At the same time, the sliding cursor 404d is slid to a cursor position representing a tenth times the normal reproduction speed in the console indication 403c. Since the long reproduction time is required, the indicated width of the frame image representation region 404a is also enlarged, as shown in FIG. 11B.

If the speed available for reproduction is set to 1/10 times the normal reproduction speed as shown in FIG. 11B, the determined value FD is set to one, namely, FD=10*(1/10)=1. When the determined value FD is set to one, namely, FD=1, the image signal Svm is generated using every FD=1 frame of the image data DV, namely, without any frame being skipped. This allows the reproduced images having a tenth times the normal reproduction speed to be represented on the monitor viewer 403 based on the image signal Svm, as shown in FIG. 12A.

An operation is carried out such that an indicated width of the frame image representation region 404a in the time line window 404 of FIG. 11A is shortened along a direction indicated by an arrow B or a sliding cursor 404d in the console indication 403c is slid on a direction indicated by an arrow A in the monitor viewer 403. In this case, a processing as the quick motion of reproduction is performed. For example, when the speed available for reproduction is set to twice as much as the normal reproduction speed, a reproduction speed indication 403b in the monitor viewer 403 is altered to "×2.0" as shown in FIG. 11C. At the same time, the sliding cursor 404d is slid to a cursor position representing twice of the normal reproduction speed in the console indication 403c. Since the short reproduction time is required, the indicated width of the frame image representation region 404a is shortened, as shown in FIG. 11C.

If the speed available for reproduction is set to twice of the normal reproduction speed as shown in FIG. 11C, the determined value FD is set to 20, namely, FD=10*2=20. When the determined value FD is set to 20, namely, FD=20, the image signal Svm is generated using every 20 frames, namely, with the image data of nineteen frames being skipped. This allows the reproduced images having twice speed as much as the normal reproduction speed to be represented on the monitor viewer 403 based on the image signal Svm, as shown in FIGS. 12H through 12J. FIG. 12H illustrates the frame identification information DM-BN for indicating the sub-frame numbers. FIG. 12I illustrates the absolute frame numbers AN of the frame images. FIG. 12J illustrates frame images represented by the image signal Svm.

Thus, the material data of the set frame rate FRs is altered to various rates using the associated information DM and the altered material data is combined with each other, thereby allowing predetermined contents-data for broadcasting, a distribution, and the like to be easily generated. Further, when the edited image data is combined with the corresponding associated information to generate the contents-data, the user side performs the same processing as the one performed in the editing apparatus using the associated information included in the contents-data, thereby allowing the reproduction speed of contents to be altered at the user side. For example, the set frame rate FRs is set to the one higher than the reference frame rate FRr to generate the material data such as sports event casting and then, using the material data, the contents-data including the associated information is generated. This allows only a predetermined scene to be seen in a slow motion by the user with other scenes being seen in normal reproduction speed.

The invention has been described in detail with reference to specific embodiments of the invention in the form of the imaging apparatus 10 having a communication function. It should be understood that the invention is not be limited to the embodiments and that the invention can be applied equally well to other types of electronic apparatuses. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An imaging apparatus comprising:
    an imaging device for reading a signal captured by an image pickup device to generate an image signal based on the image captured by said image pickup device;
    a signal processor for generating image data of a predetermined frame rate based on said generated image signal;
    a controller for controlling said imaging device or said signal processor to establish a variable frame rate of said image data different from said predetermined frame rate, said established frame rate constituting a set frame rate, said controller generating frame rate information identifying said set frame rate of respective frames of said image data and generating sub-frame information identifying individual frames of said image data having said set frame rate when said set frame rate is higher than a reference frame rate and said individual frames are included in a frame period defined by said reference frame rate; and
    a transmitter for combining said frame rate information and said sub-frame information with said image data to transmit combined data.

2. The imaging apparatus according to claim 1, wherein said controller establishes the variable frame rate of said image data by altering a reading frequency at which the captured signal is read from the image pickup device.

3. The imaging apparatus according to claim 1, wherein said controller establishes the variable frame rate of said image data by controlling said signal processor to perform frame-skipping.

4. The imaging apparatus according to claim 1, wherein said controller establishes the variable frame rate of said image data by altering a reading frequency at which the captured signal is read from said image pickup device and by controlling said signal processor to add said image on a frame basis.

5. The imaging apparatus according to claim 1, wherein said signal processor samples an analog audio signal at a sampling frequency based on said set frame rate to generate audio data; and
    wherein said transmitter combines said frame rate information and said sub-frame information with said image data and said audio data.

6. The imaging apparatus according to claim 1, further comprising a signal recording apparatus for receiving said combined frame rate information and said sub-frame information and said image data to record the combined frame rate information and said sub-frame information and image data on a recording medium.

7. An imaging method comprising the steps of:
    generating image data at a predetermined frame rate based on a signal read from an image pickup device;
    establishing a variable frame rate of said image data different from said predetermined frame rate, said established frame rate constituting a set frame rate;
    generating frame rate information identifying said set frame rate of respective frames of said image data and generating sub-frame information identifying individual frames of said image data having said set frame rate when said set frame rate is higher than a reference frame rate and said individual frames are included in a frame period defined by said reference frame rate; and combining said frame rate information and said sub-frame information with said image data to transmit the combined data.

8. The imaging method according to claim 7, wherein the variable frame rate of said image data is established by altering a reading frequency at which the signal is read from said image pickup device.

9. The imaging method according to claim 7, wherein the variable frame rate of said image data is established by frame-skipping.

10. The imaging method according to claim 7, wherein the variable frame rate of said image data is established by altering a reading frequency at which the signal is read from said image pickup device and said image data is added on a frame basis.

11. The imaging method according to claim 7, further comprising the steps of:

sampling an analog audio signal at a sampling frequency based on said set frame rate to generate audio data; and wherein said frame rate information and said sub-frame information is combined with said image data and said audio data.

12. The imaging method according to claim 7, wherein said combined frame rate information and said sub-frame information and image data is transmitted to signal recording apparatus for recording on a recording medium.

* * * * *